US012307712B1

(12) United States Patent
Li et al.

(10) Patent No.: US 12,307,712 B1
(45) Date of Patent: May 20, 2025

(54) METHOD AND APPARATUS FOR LOCALIZING INTELLIGENT VEHICLE IN DYNAMIC SCENE

(71) Applicant: Beijing University of Chemical Technology, Beijing (CN)

(72) Inventors: Zhiwei Li, Beijing (CN); Jingwei Wang, Beijing (CN); Ruosen Hao, Beijing (CN); Yang Zhou, Beijing (CN); Wei Zhang, Beijing (CN); Kunfeng Wang, Beijing (CN); Wei Zhang, Beijing (CN); Li Wang, Beijing (CN); Qifan Tan, Beijing (CN); Tianyu Shen, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 0 days.

(21) Appl. No.: 19/026,644

(22) Filed: Jan. 17, 2025

(30) Foreign Application Priority Data

Apr. 11, 2024 (CN) .......................... 202410435956.8

(51) Int. Cl.
| | | |
|---|---|---|
| *G06T 7/73* | (2017.01) | |
| *G06T 7/20* | (2017.01) | |
| *G06T 7/521* | (2017.01) | |
| *G06V 10/75* | (2022.01) | |
| *G06V 20/58* | (2022.01) | |

(52) U.S. Cl.
CPC .................. *G06T 7/74* (2017.01); *G06T 7/20* (2013.01); *G06T 7/521* (2017.01); *G06V 10/751* (2022.01); *G06V 20/58* (2022.01); *G06T 2207/10016* (2013.01); *G06T 2207/10024* (2013.01); *G06T 2207/10028* (2013.01);

(Continued)

(58) Field of Classification Search
CPC .. G06T 7/74; G06T 7/521; G06T 7/20; G06T 2207/10016; G06T 2207/10024; G06T 2207/10028; G06T 2207/10044; G06T 2207/20081; G06T 2207/30252; G06V 20/58; G06V 10/751; G06V 2201/07
USPC ......................................................... 382/103
See application file for complete search history.

(56) References Cited

U.S. PATENT DOCUMENTS

| | | | |
|---|---|---|---|
| 2017/0178352 A1* | 6/2017 | Harmsen ................. | G06T 7/292 |
| 2023/0296758 A1* | 9/2023 | Akbarzadeh ........... | G06V 10/82 |
| | | | 382/103 |

FOREIGN PATENT DOCUMENTS

| | | |
|---|---|---|
| CN | 114170315 A | 3/2022 |
| WO | 2022183785 A1 | 9/2022 |

* cited by examiner

*Primary Examiner* — Kenny A Cese
(74) *Attorney, Agent, or Firm* — Bayramoglu Law Offices LLC

(57) ABSTRACT

A method and apparatus for localizing an intelligent vehicle in a dynamic scene are provided. The localizing method includes: processing an RGB image using a target detection model to determine a rectangular box of a movable object; converting first point cloud data and second point cloud data to a pixel coordinate system, and dividing the movable object into a static object and a dynamic object; converting the second point cloud data of the movable object in the pixel coordinate system to a map coordinate system to obtain a semantic point cloud map; converting the second point cloud data of a communication area, and of a rectangular box, in the pixel coordinate system to the map coordinate system to obtain a static point cloud map; and determining observation weights for objects in the second point cloud data, and thereby determining pose information of the intelligent vehicle at the current time.

16 Claims, 3 Drawing Sheets

(52) U.S. Cl.
CPC ............... *G06T 2207/10044* (2013.01); *G06T 2207/20081* (2013.01); *G06T 2207/30252* (2013.01); *G06V 2201/07* (2022.01)

METHOD AND APPARATUS FOR LOCALIZING INTELLIGENT VEHICLE IN DYNAMIC SCENE

CROSS REFERENCE TO THE RELATED APPLICATIONS

This application is based upon and claims priority to Chinese Patent Application No. 202410435956.8, filed on Apr. 11, 2024, the entire contents of which are incorporated herein by reference.

TECHNICAL FIELD

The present application relates to the technical field of autonomous driving, in particular to a method and apparatus for localizing an intelligent vehicle in a dynamic scene.

BACKGROUND

Research in the field of mapping and localization with dynamic and movable objects is one of research focuses and challenges in autonomous driving. Current mapping and localization systems are typically based on the assumption of a static environment or are only capable of addressing mapping and localization in environments containing highly dynamic objects. However, movable objects in such environments often seriously affect mapping and localization accuracy.

No effective solutions have been proposed yet to address the problem described above.

SUMMARY

In view of this, the present application provides a method and apparatus for localizing an intelligent vehicle in a dynamic scene to solve the above technical problem described above.

In a first aspect, embodiments of the present application provide a method for localizing an intelligent vehicle in a dynamic scene, including:
acquiring first point cloud data collected by a 4D millimeter wave radar, second point cloud data collected by a lidar, and a red green blue (RGB) image collected by an RGB camera, for a target area at current time;
processing the RGB image using a target detection model to determine a rectangular box of a movable object;
converting the first point cloud data and the second point cloud data to a pixel coordinate system, and dividing the movable object into a static object and a dynamic object based on a velocity of the first point cloud data in the rectangular box of the movable object;
converting the second point cloud data of the movable object in the pixel coordinate system to a map coordinate system to obtain a semantic point cloud map;
converting the second point cloud data of a communication area outside the rectangular box of the movable object, and of a rectangular box of the static object, in the pixel coordinate system to the map coordinate system to obtain a static point cloud map;
determining observation weights for objects in the second point cloud data based on the static point cloud map and the semantic point cloud map; and
determining pose information of the intelligent vehicle at the current time using the observation weights of the objects in the second point cloud data.

Further, determining observation weights for dynamic objects based on the static point cloud map and the semantic point cloud map includes:
acquiring a distance value from the lidar for each point in the second point cloud data;
calculating a first distance value in the static point cloud map for the distance value from the lidar for each point, and a second distance value in the semantic point cloud map for the distance value from the lidar for each point, respectively;
determining a difference between the first distance value and the second distance value; and
obtaining an observation weight for each point in the second point cloud data using a pre-established equation for the relationship between the observation weight and the difference, wherein the larger the difference, the smaller the observation weight.

Further, the equation for the relationship between the observation weight and the difference is:

$$W = f(\delta, \nabla d)$$

where $f(\delta, \nabla d)$ is an inverse exponential function of the distance difference $\nabla d$, W is the observation weight, $\nabla d$ is the difference, $\delta$ is a parameter to be learned, and W takes values in the range [0, 1].

Further, determining pose information of the intelligent vehicle at the current time using the observation weights of the objects in the second point cloud data includes:
selecting a plurality of feature points in the second point cloud data at the current time;
determining feature points with observation weights less than a preset threshold as static feature points;
matching a plurality of static feature points in the second point cloud data at the current time with a plurality of static feature points in second point cloud data at the previous time to obtain N static feature point matched pairs;
determining a transformation matrix from an intelligent vehicle coordinate system at the previous time to an intelligent vehicle coordinate system at the current time using three-dimensional positions of static feature points of the N matched pairs in the map coordinate system; and
determining a pose of the intelligent vehicle at the current time using a pose of the intelligent vehicle at the previous time and the transformation matrix.

Further, the feature points include edge feature points and planar feature points.

Further, the method further includes:
acquiring a training sample set including consecutive intelligent vehicle sequence frame data, each intelligent vehicle sequence frame data including a first point cloud data sample, a second point cloud data sample, an RGB image sample, and an actual pose of the intelligent vehicle;
processing the RGB image sample using the target detection model to determine a rectangular box of a movable object;
converting the first point cloud data sample and second point cloud data sample to the pixel coordinate system, and dividing the movable object into a static object and a dynamic object based on a velocity of the first point cloud data sample in the rectangular box of the movable object;

converting the second point cloud data sample of the movable object in the pixel coordinate system to the map coordinate system to obtain a semantic point cloud map sample;

converting the second point cloud data sample of a communication area outside the rectangular box of the movable object, and of a rectangular box of the static object in the pixel coordinate system to the map coordinate system to obtain a static point cloud map sample;

determining observation weights for objects in the second point cloud data sample based on the static point cloud map sample and the semantic point cloud map sample;

acquiring a distance value from the lidar for each point in the second point cloud data sample;

calculating a third distance value in the static point cloud map sample for the distance value from the lidar for each point, and a fourth distance value in the semantic point cloud map sample for the distance value from the lidar for each point, and determining a difference between the third distance value and the fourth distance value;

determining an observation weight corresponding to the difference between the third distance value and the fourth distance value according to the equation for the relation between the observation weight and the difference: $W=f(\delta, \nabla d)$;

determining predicted pose information of the intelligent vehicle at a current frame using the observation weights of the objects in the second point cloud data sample;

calculating a position error using predicted position information and actual position information of the intelligent vehicle at the current frame; and updating the parameter $\delta$ using the position error.

In a second aspect, embodiments of the present application provide an apparatus for localizing an intelligent vehicle in a dynamic scene, including:

an acquisition unit configured to acquire first point cloud data collected by a 4D millimeter wave radar, second point cloud data collected by a lidar, and an RGB image collected by an RGB camera, for a target area at current time;

a detection unit configured to process the RGB image using a target detection model to determine a rectangular box of a movable object;

a division unit configured to convert the first point cloud data and the second point cloud data to a pixel coordinate system, and divide the movable object into a static object and a dynamic object based on a velocity of the first point cloud data in the rectangular box of the movable object;

a first processing unit configured to convert the second point cloud data of the movable object in the pixel coordinate system to a map coordinate system to obtain a semantic point cloud map;

a second processing unit configured to convert the second point cloud data of a communication area outside the rectangular box of the movable object, and of a rectangular box of the static object, in the pixel coordinate system to the map coordinate system to obtain a static point cloud map;

a determination unit configured to determine observation weights for objects in the second point cloud data based on the static point cloud map and the semantic point cloud map; and a localization unit configured to determine pose information of the intelligent vehicle at the current time using the observation weights of the objects in the second point cloud data.

In a third aspect, embodiments of the present application provide an electronic device, including a processor, a memory, and a computer program stored in the memory and executable on the processor, wherein when executing the computer program, the processor implements the method in embodiments of the present application.

In a fourth aspect, embodiments of the present application provide a computer readable storage medium, wherein the computer readable storage medium stores computer instructions which, when executed by a processor, implements the method in embodiments of the present application.

The present application improves the accuracy of intelligent vehicle localization in a dynamic scene.

BRIEF DESCRIPTION OF THE DRAWINGS

To describe technical solutions in specific embodiments of the present application or in the prior art more clearly, a brief introduction to drawings for use in description of the specific embodiments or the prior art will be provided below. Obviously, the drawings described below represent some implementations of the present application, and for those of ordinary skill in the art, other drawings may also be obtained based on the drawings without creative work.

DETAILED DESCRIPTION OF THE EMBODIMENTS

Figure 1:
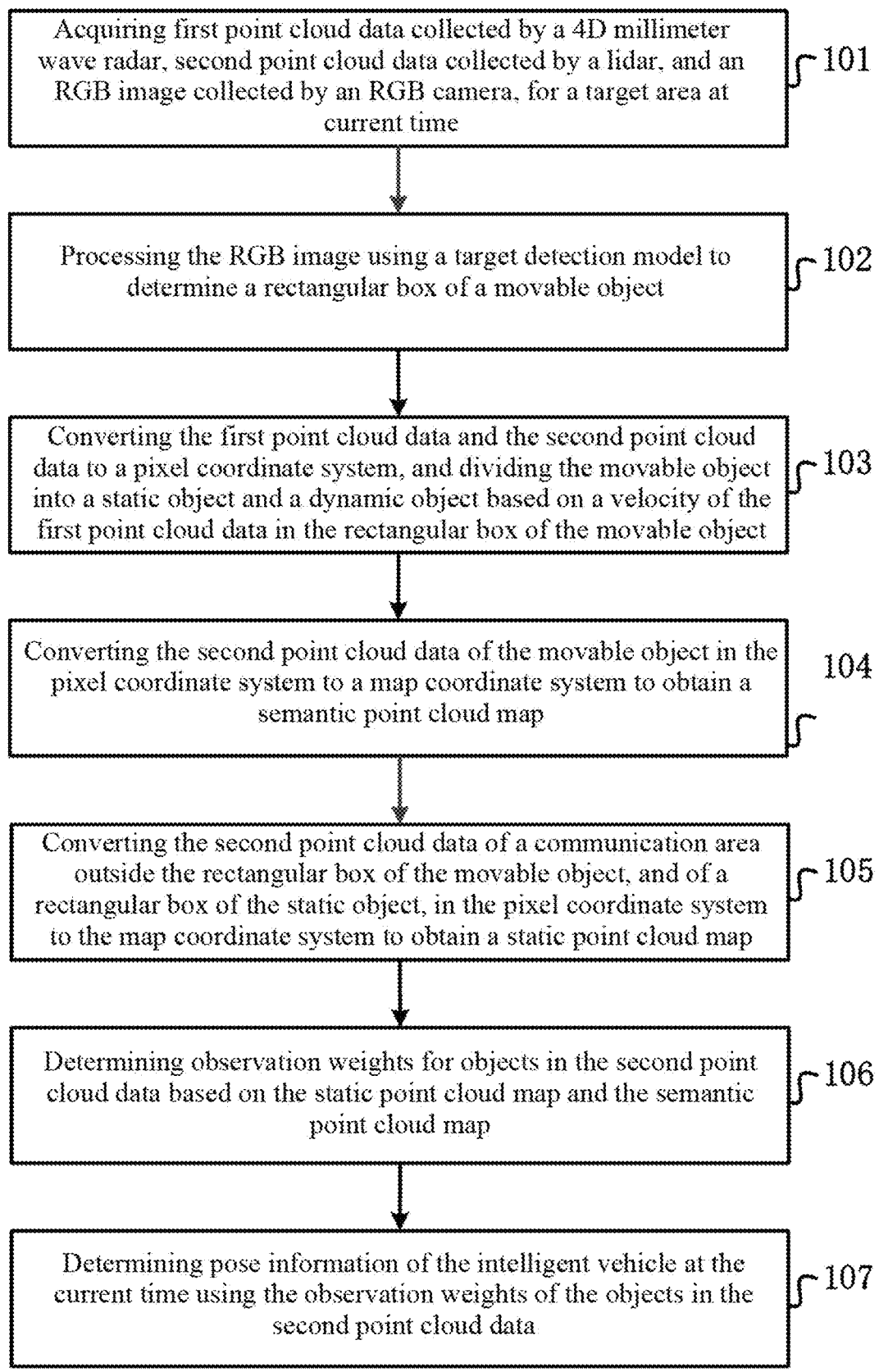
FIG. 1 is a flow diagram of a method for localizing an intelligent vehicle in a dynamic scene provided in embodiments of the present application.

To make the objects, technical solutions and advantages of embodiments of the present application more explicit, technical solutions in embodiments of the present application will be described below clearly and thoroughly in conjunction with drawings in embodiments of the present application. Evidently, the described embodiments represent part of, but not all of, embodiments of the present application. Components in embodiments of the present application, as generally described and shown in the drawings here, can be arranged and designed in a variety of different configurations.

Therefore, the following detailed description of embodiments of the present application provided in the drawings is not intended to limit the scope of the present application as claimed, but merely represents selected embodiments of the present application. Based on embodiments in the present application, all other embodiments obtained by those of ordinary skill in the art without creative work, fall within the scope of protection of the present application.

The technical solutions provided in embodiments of the present application are described below.

As shown in FIG. 1, embodiments of the present application provide a method for localizing an intelligent vehicle in a dynamic scene, including steps as follows:

Step 101: acquiring first point cloud data collected by a 4D millimeter wave radar, second point cloud data collected by a lidar, and an RGB image collected by an RGB camera, for a target area at current time;

Step 102: processing the RGB image using a target detection model to determine a rectangular box of a movable object;

Step 103: converting the first point cloud data and the second point cloud data to a pixel coordinate system, and dividing the movable object into a static object and a dynamic object based on a velocity of the first point cloud data in the rectangular box of the movable object;

Step 104: converting the second point cloud data of the movable object in the pixel coordinate system to a map coordinate system to obtain a semantic point cloud map;

Step 105: converting the second point cloud data of a communication area outside the rectangular box of the movable object, and of a rectangular box of the static object, in the pixel coordinate system to the map coordinate system to obtain a static point cloud map;

Step 106: determining observation weights for objects in the second point cloud data based on the static point cloud map and the semantic point cloud map; and Step 107: determining pose information of the intelligent vehicle at the current time using the observation weights of the objects in the second point cloud data.

The present application provides a method for localizing an intelligent vehicle in a dynamic scene. The method can solve the problem of reduced accuracy of intelligent vehicle localization due to dynamic objects in a dynamic scene; and can effectively improve the accuracy of intelligent vehicle localization in a dynamic scene.

In some embodiments, determining observation weights for objects in the second point cloud data based on the static point cloud map and the semantic point cloud map in step 106 includes:

acquiring a distance value from the lidar for each point in the second point cloud data;

calculating a first distance value in the static point cloud map for the distance value from the lidar for each point, and a second distance value in the semantic point cloud map for the distance value from the lidar for each point, respectively;

determining a difference between the first distance value and the second distance value; and obtaining an observation weight for each point in the second point cloud data using a pre-established equation for the relationship between the observation weight and the difference, wherein the larger the difference, the smaller the observation weight.

In some embodiments, the equation for the relationship between the observation weight and the difference is:

$$W = f(\delta, \nabla d)$$

where $f(\delta, \nabla d)$ is an inverse exponential function of the distance difference $\nabla d$, $W$ is the observation weight, $\nabla d$ is the difference, $\delta$ is a parameter to be learned, and $W$ takes values in the range $[0, 1]$.

In some embodiments, determining pose information of the intelligent vehicle at the current time using the observation weights of the objects in the second point cloud data in step 107 includes:

selecting a plurality of feature points in the second point cloud data at the current time;

determining feature points with observation weights less than a preset threshold as static feature points, wherein preferably, the preset threshold is 0.3;

matching a plurality of static feature points in the second point cloud data at the current time with a plurality of static feature points in second point cloud data at the previous time to obtain N static feature point matched pairs;

determining a transformation matrix from an intelligent vehicle coordinate system at the previous time to an intelligent vehicle coordinate system at the current time using three-dimensional positions of static feature points of the N matched pairs in the map coordinate system; and determining a pose of the intelligent vehicle at the current time using a pose of the intelligent vehicle at the previous time and the transformation matrix.

In some embodiments, the feature points include edge feature points and planar feature points.

The edge feature points and the planar feature points are extracted by calculating a curvature of each point. The edge feature points include corner points and points with larger curvatures, meaning that they are at edges or corners of objects, reflecting linear structures in the environment, such as wall corners or other protruding edges of objects. The planar feature points include points with smaller curvature values, which are generally located on larger planar surfaces, such as walls surfaces, ground, or other large planar structures.

In some embodiments, the method further includes:

acquiring a training sample set including consecutive intelligent vehicle sequence frame data, each intelligent vehicle sequence frame data including a first point cloud data sample, a second point cloud data sample, an RGB image sample, and an actual pose of the intelligent vehicle;

processing the RGB image sample using the target detection model to determine a rectangular box of a movable object;

converting the first point cloud data sample and second point cloud data sample to the pixel coordinate system, and dividing the movable object into a static object and a dynamic object based on a velocity of the first point cloud data sample in the rectangular box of the movable object;

converting the second point cloud data sample of the movable object in the pixel coordinate system to the map coordinate system to obtain a semantic point cloud map sample;

converting the second point cloud data sample of a communication area outside the rectangular box of the movable object, and of a rectangular box of the static object in the pixel coordinate system to the map coordinate system to obtain a static point cloud map sample;

determining observation weights for objects in the second point cloud data sample based on the static point cloud map sample and the semantic point cloud map sample;

acquiring a distance value from the lidar for each point in the second point cloud data sample;

calculating a third distance value in the static point cloud map sample for the distance value from the lidar for each point, and a fourth distance value in the semantic point cloud map sample for the distance value from the lidar for each point, and determining a difference between the third distance value and the fourth distance value;

determining an observation weight corresponding to the difference between the third distance value and the fourth distance value according to the equation for the relation between the observation weight and the difference: $W=f(\delta, \nabla d)$;

determining predicted pose information of the intelligent vehicle at a current frame using the observation weights of the objects in the second point cloud data sample;

calculating a position error using predicted position information and actual position information of the intelligent vehicle at the current frame; and updating the parameter $\delta$ using the position error.

Figure 2:
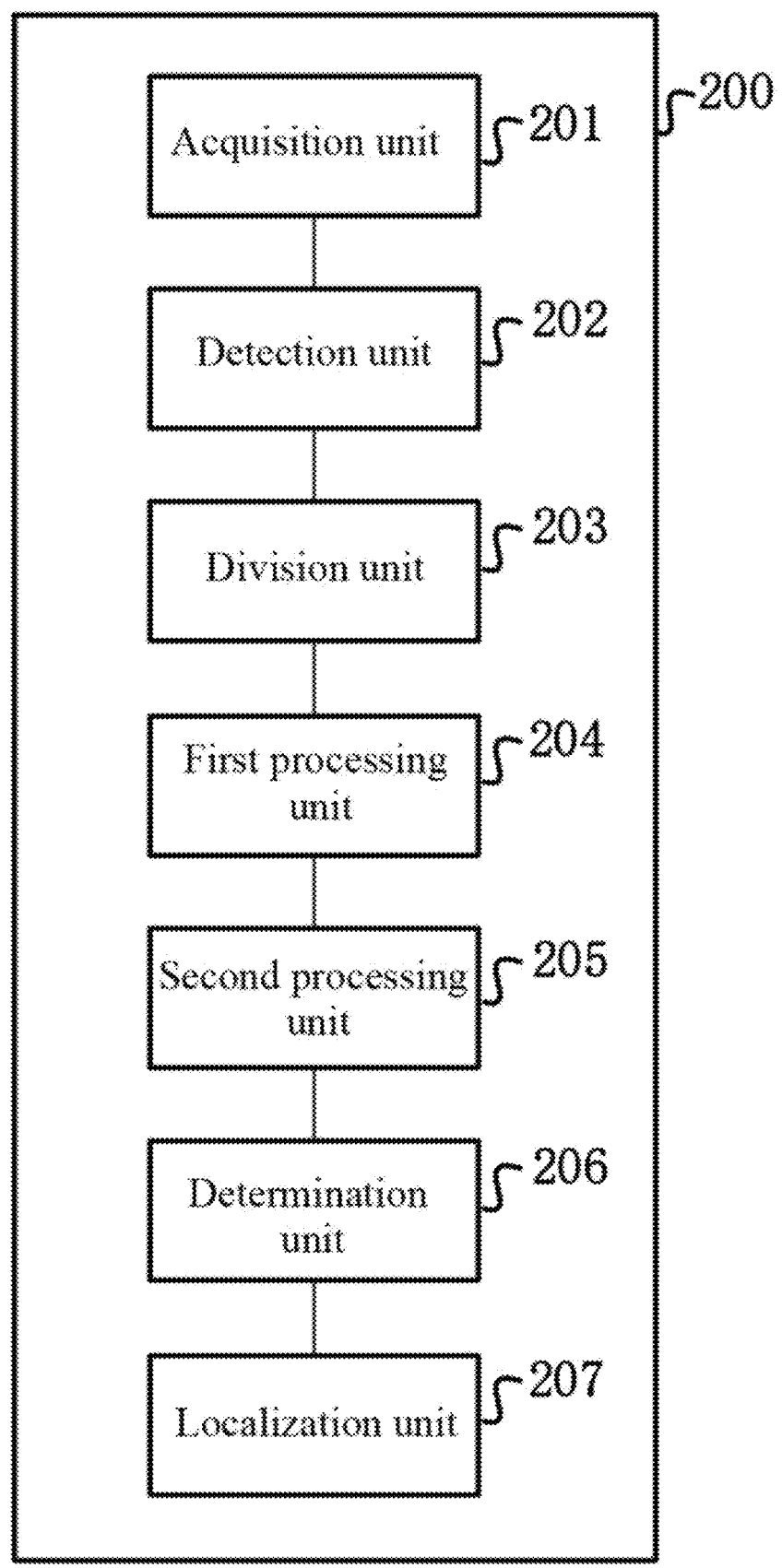
FIG. 2 is a functional structure diagram of an apparatus for localizing an intelligent vehicle in a dynamic scene provided in embodiments of the present application.

Based on the above embodiment, embodiments of the present application provide an apparatus for localizing an intelligent vehicle in a dynamic scene. Referring to FIG. 2, an apparatus 200 for localizing an intelligent vehicle in a dynamic scene provided in embodiments of the present application includes at least:

an acquisition unit 201 configured to acquire first point cloud data collected by a 4D millimeter wave radar, second point cloud data collected by a lidar, and an RGB image collected by an RGB camera, for a target area at current time;

a detection unit 202 configured to process the RGB image using a target detection model to determine a rectangular box of a removable object;

a division unit 203 configured to convert the first point cloud data and the second point cloud data to a pixel coordinate system, and divide the movable object into a static object and a dynamic object based on a velocity of the first point cloud data in the rectangular box of the movable object;

a first processing unit 204 configured to convert the second point cloud data of the movable object in the pixel coordinate system to a map coordinate system to obtain a semantic point cloud map;

a second processing unit 205 configured to convert the second point cloud data of a communication area outside the rectangular box of the movable object, and of a rectangular box of the static object, in the pixel coordinate system to the map coordinate system to obtain a static point cloud map;

a determination unit 206 configured to determine observation weights for objects in the second point cloud data based on the static point cloud map and the semantic point cloud map; and a localization unit 207 configured to determine pose information of the intelligent vehicle at the current time using the observation weights of the objects in the second point cloud data.

It should be noted that the principle by which the technical problem is solved by the apparatus 200 for localizing an intelligent vehicle in a dynamic scene provided in embodiments of the present application is similar to that of the method provided in embodiments of the present application. Therefore, for the implementation of the apparatus 200 for localizing an intelligent vehicle in a dynamic scene provided in embodiments of the present application, reference may be made to the implementation of the method provided in embodiments of the present application, and redundant details are not repeated here.

Figure 3:
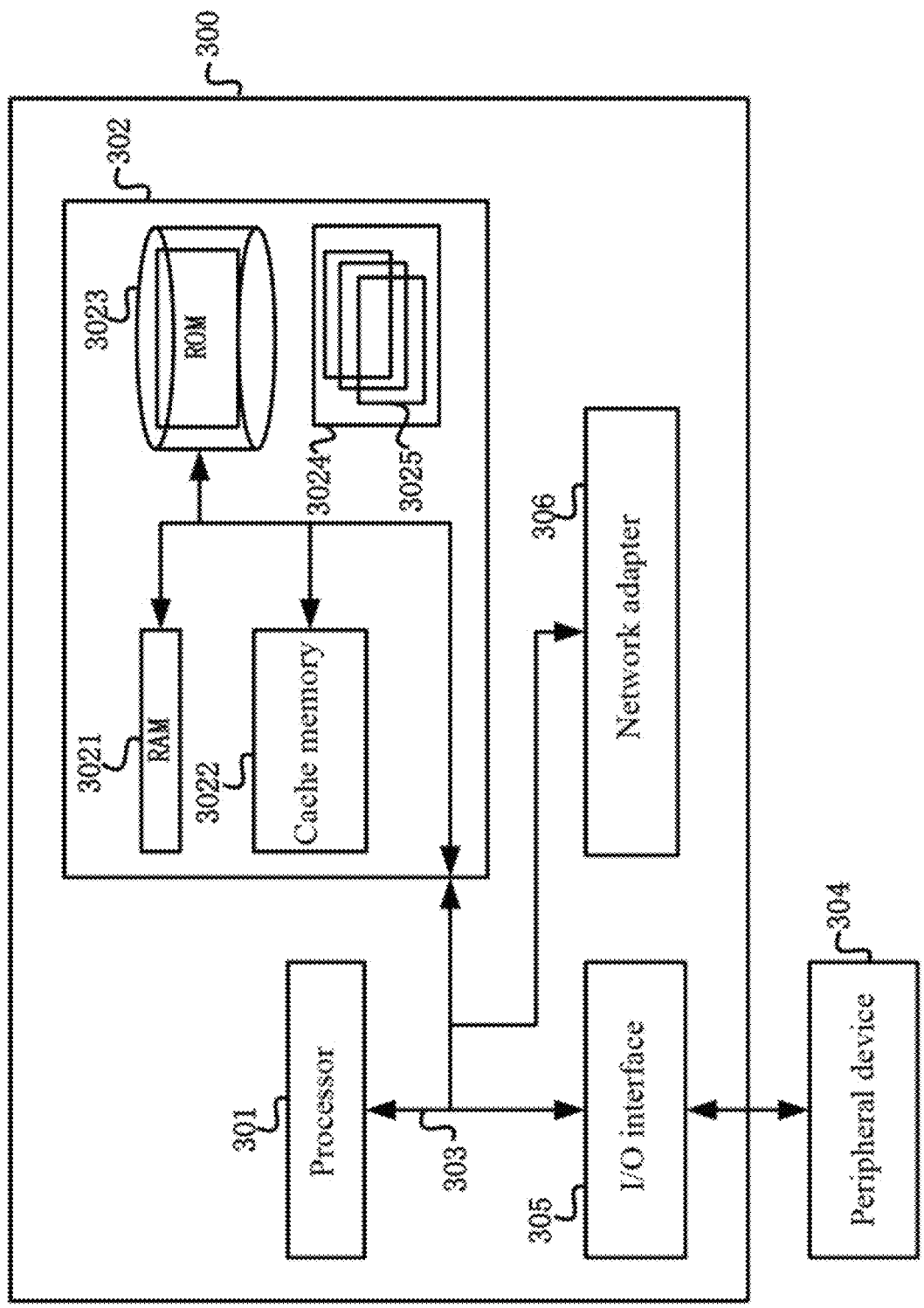
FIG. 3 is a functional structure diagram of an electronic device provided in embodiments of the present application.

Based on the above embodiment, embodiments of the present application also provide an electronic device. Referring to FIG. 3, an electronic device 300 provided in embodiments of the present application includes at least: a processor 301, a memory 302, and a computer program stored in the memory 302 and executable on the processor 301. When executing the computer program, the processor 301 implements the method for localizing an intelligent vehicle in a dynamic scene provided in embodiments of the present application.

The electronic device 300 provided in embodiments of the present application may also include a bus 303 connecting different components (including the processor 301 and the memory 302). The bus 303 represents one or more of several types of bus structures, including a memory bus, a peripheral bus, a local bus, etc.

The memory 302 may include a readable medium in the form of a volatile memory, such as a random access memory (RAM) 3021 and/or a cache memory 3022, and may further include a read only memory (ROM) 3023.

The memory 302 may further include a program tool 3025 with a set of (at least one) program modules 3024. The program modules 3024 include, but are not limited to, an operating subsystem, one or more application programs, other program modules, and program data. Each or some combination of the examples may include an implementation of a network environment.

The electronic device 300 may also communicate with one or more peripheral devices 304 (e.g., a keyboard, a remote control, etc.), and may also communicate with one or more devices (e.g., a mobile phone, a computer, etc.) that enable a user to interact with the electronic device 300, and/or communicate with any device (e.g., a router, a modem, etc.) that enables the electronic device 300 to communicate with one or more other electronic devices 300. Such communication may be performed through an input/output (I/O) interface 305. Furthermore, the electron device 300 may also communicate with one or more networks (e.g., a local area network (LAN), a wide area network (WAN), and/or a public network such as the Internet) through a network adapter 306. As shown in FIG. 3, the network adapter 306 communicates with other modules of the electronic device 300 through the bus 303. It should be understood that although not shown in FIG. 3, other hardware and/or software modules may be used in conjunction with the electronic device 300, including but not limited to: microcode, device drivers, redundant processors, external disk drive arrays, redundant arrays of independent disks (RAID) subsystems, tape drives, and data backup storage subsystems.

It should be noted that the electronic device 300 shown in FIG. 3 is only an example, and should not be construed as limiting the functions and scope of use of embodiments of the present application.

Embodiments of the present application also provide a computer readable storage medium. The computer readable storage medium stores computer instructions. The computer instructions, when executed by a processor, implements the method for localizing an intelligent vehicle in a dynamic scene provided in embodiments of the present application. Specifically, the executable program may be built-in or installed in the electronic device 300 such that the electronic device 300 may implement the method for localizing an intelligent vehicle in a dynamic scene provided in embodiments of the present application by executing the built-in or installed executable program.

The method for localizing an intelligent vehicle in a dynamic scene provided in embodiments of the present application may also be implemented as a program product, which includes a program code. When the program product is run on the electronic device 300, the program code is configured to cause the electronic device 300 to execute the method for localizing an intelligent vehicle in a dynamic scene provided in embodiments of the present application.

The program product provided in embodiments of the present application may be any combination of one or more readable media. Such a readable medium may be a readable signal medium or a readable storage medium. The readable storage medium may be, but is not limited to, an electronic, magnetic, optical, electromagnetic, infrared, or semiconductor system, apparatus or device, or any combination thereof. Specifically, more specific examples (a non-exhaustive list) of the readable storage medium include: an electrical connection with one or more conducting wires, a portable disk, a hard disk, a RAM, a ROM, an erasable programmable read only memory (EPROM), an optical fiber, a portable compact disc read-only memory (CD-ROM), an optical storage device, a magnetic storage device, or any suitable combination thereof.

The program product provided in embodiments of the present application may be a CD-ROM and includes a program code, and may also be run on a computing device. However, the program product provided in embodiments of the present application is not limited thereto. In embodiments of the present application, the readable storage medium may be any tangible medium containing or storing a program. The program may be used by or in combination with an instruction execution system, apparatus or device.

It should be noted that although a number of units or sub-units of the apparatus are mentioned in the detailed description above, this division is only exemplary and not mandatory. Indeed, according to implementations of the present application, features and functions of two or more of the units described above may be embodied in a single unit. Conversely, features and functions of one of the units described above may be further divided to be embodied by a plurality of units.

In addition, although the operations of the method of the present application are described in a particular order in the accompanying drawings, it is not required or implied that the operations must be performed in that particular order, or that all of the operations shown must be performed to achieve a desired result. Additionally or alternatively, certain steps may be omitted, a plurality of steps may be combined to be performed as one step, and/or one step may be broken down to be performed as a plurality of steps.

Finally, it should be noted that the above embodiments are only used for describing instead of limiting the technical solutions of the present application. Although the present application is described in detail with reference to the embodiments, those of ordinary skill in the art should understand that modifications or equivalent substitutions of the technical solutions of the present application without departing from the spirit and scope of the technical solutions of the present application should be encompassed within the scope of the claims of the present application.

What is claimed is:

1. A method for localizing an intelligent vehicle in a dynamic scene, comprising:
   acquiring first point cloud data collected by a 4D millimeter wave radar, second point cloud data collected by a lidar, and a red green blue (RGB) image collected by an RGB camera, for a target area at a current time;
   processing the RGB image using a target detection model to determine a rectangular box of a movable object;
   converting the first point cloud data and the second point cloud data to a pixel coordinate system, and dividing the movable object into a static object and a dynamic object based on a velocity of the first point cloud data in the rectangular box of the movable object;
   converting the second point cloud data of the movable object in the pixel coordinate system to a map coordinate system to obtain a semantic point cloud map;
   converting the second point cloud data of a communication area outside the rectangular box of the movable object, and of a rectangular box of the static object, in the pixel coordinate system to the map coordinate system to obtain a static point cloud map;
   determining observation weights for objects in the second point cloud data based on the static point cloud map and the semantic point cloud map; and
   determining pose information of the intelligent vehicle at the current time using the observation weights of the objects in the second point cloud data;
   wherein the method further comprises:
   acquiring a training sample set comprising consecutive intelligent vehicle sequence frame data, wherein each of the consecutive intelligent vehicle sequence frame data comprises a first point cloud data sample, a second point cloud data sample, an RGB image sample, and an actual pose of the intelligent vehicle;
   processing the RGB image sample using the target detection model to determine the rectangular box of the movable object;
   converting the first point cloud data sample and the second point cloud data sample to the pixel coordinate system, and dividing the movable object into the static object and the dynamic object based on a velocity of the first point cloud data sample in the rectangular box of the movable object;
   converting the second point cloud data sample of the movable object in the pixel coordinate system to the map coordinate system to obtain a semantic point cloud map sample;
   converting the second point cloud data sample of the communication area outside the rectangular box of the movable object, and of the rectangular box of the static object, in the pixel coordinate system to the map coordinate system to obtain a static point cloud map sample;
   determining the observation weights for the objects in the second point cloud data sample based on the static point cloud map sample and the semantic point cloud map sample;
   acquiring a distance value from the lidar for each point in the second point cloud data sample;
   calculating a third distance value in the static point cloud map sample for the distance value from the lidar for each point, and a fourth distance value in the semantic point cloud map sample for the distance value from the lidar for each point, and determining a first difference between the third distance value and the fourth distance value;
   determining an observation weight corresponding to the first difference between the third distance value and the fourth distance value according to an equation for a relation between the observation weight and the first difference: $W=f(\delta, \nabla d)$; wherein $f(\delta, \nabla d)$ is an inverse exponential function, $W$ is the observation weight, $\nabla d$ is the first difference, $\delta$ is a parameter to be learned, and $W$ takes values in a range $[0, 1]$;
   determining predicted pose information of the intelligent vehicle at a current frame using the observation weights of the objects in the second point cloud data sample;

calculating a position error using predicted position information and actual position information of the intelligent vehicle at the current frame; and updating the parameter δ using the position error.

2. The method according to claim 1, wherein the step of determining the observation weights for the objects in the second point cloud data based on the static point cloud map and the semantic point cloud map comprises:

acquiring a distance value from the lidar for each point in the second point cloud data;

calculating a first distance value in the static point cloud map for the distance value from the lidar for each point, and a second distance value in the semantic point cloud map for the distance value from the lidar for each point, respectively;

determining a second difference between the first distance value and the second distance value; and obtaining an observation weight for each point in the second point cloud data using a pre-established equation for a relationship between the observation weight and the second difference, wherein the observation weight decreases as the second difference increases.

3. The method according to claim 2, wherein the pre-established equation for the relationship between the observation weight and the second difference is:

$$W=f(\delta, \nabla d)$$

wherein $f(\delta, \nabla d)$ is an inverse exponential function of the second difference $\nabla d$, W is the observation weight, $\nabla d$ is the second difference, δ is a parameter to be learned, and W takes values in the range [0, 1].

4. The method according to claim 3, wherein the step of determining pose information of the intelligent vehicle at the current time using the observation weights of the objects in the second point cloud data comprises:

selecting a plurality of feature points in the second point cloud data at the current time;

determining feature points with observation weights less than a preset threshold as static feature points;

matching a plurality of static feature points in the second point cloud data at the current time with a plurality of static feature points in second point cloud data at a previous time to obtain N static feature point matched pairs;

determining a transformation matrix from an intelligent vehicle coordinate system at the previous time to an intelligent vehicle coordinate system at the current time using three-dimensional positions of static feature points of the N static feature point matched pairs in the map coordinate system; and determining a pose of the intelligent vehicle at the current time using a pose of the intelligent vehicle at the previous time and the transformation matrix.

5. The method according to claim 4, wherein the plurality of feature points comprise edge feature points and planar feature points.

6. An electron device, comprising a memory, a processor, and a computer program stored in the memory and executable on the processor, wherein when executing the computer program, the processor implements the method according to claim 1.

7. The electron device according to claim 6, wherein in the method, the step of determining the observation weights for the objects in the second point cloud data based on the static point cloud map and the semantic point cloud map comprises:

acquiring a distance value from the lidar for each point in the second point cloud data;

calculating a first distance value in the static point cloud map for the distance value from the lidar for each point, and a second distance value in the semantic point cloud map for the distance value from the lidar for each point, respectively;

determining a second difference between the first distance value and the second distance value; and obtaining an observation weight for each point in the second point cloud data using a pre-established equation for a relationship between the observation weight and the second difference, wherein the observation weight decreases as the second difference increases.

8. The electron device according to claim 7, wherein in the method, the pre-established equation for the relationship between the observation weight and the second difference is:

$$W=f(\delta, \nabla d)$$

wherein $f(\delta, \nabla d)$ is an inverse exponential function of the second difference $\nabla d$, W is the observation weight, $\nabla d$ is the second difference, δ is a parameter to be learned, and W takes values in the range [0, 1].

9. The electron device according to claim 8, wherein in the method, the step of determining pose information of the intelligent vehicle at the current time using the observation weights of the objects in the second point cloud data comprises:

selecting a plurality of feature points in the second point cloud data at the current time;

determining feature points with observation weights less than a preset threshold as static feature points;

matching a plurality of static feature points in the second point cloud data at the current time with a plurality of static feature points in second point cloud data at a previous time to obtain N static feature point matched pairs;

determining a transformation matrix from an intelligent vehicle coordinate system at the previous time to an intelligent vehicle coordinate system at the current time using three-dimensional positions of static feature points of the N static feature point matched pairs in the map coordinate system; and determining a pose of the intelligent vehicle at the current time using a pose of the intelligent vehicle at the previous time and the transformation matrix.

10. The electron device according to claim 9, wherein in the method, the plurality of feature points comprise edge feature points and planar feature points.

11. A non-transitory computer readable storage medium, wherein the computer readable storage medium stores computer instructions, and the computer instructions are executed by a processor to implement the method according to claim 1.

12. A non-transitory computer readable storage medium according to claim 11, wherein in the method, the step of determining the observation weights for the objects in the second point cloud data based on the static point cloud map and the semantic point cloud map comprises:

acquiring a distance value from the lidar for each point in the second point cloud data;

calculating a first distance value in the static point cloud map for the distance value from the lidar for each point, and a second distance value in the semantic point cloud map for the distance value from the lidar for each point, respectively;

determining a second difference between the first distance value and the second distance value; and obtaining an observation weight for each point in the second point cloud data using a preestablished equation for a relationship between the observation weight and the second difference, wherein the observation weight decreases as the second difference increases.

13. The non-transitory computer readable storage medium according to claim 12, wherein in the method, the preestablished equation for the relationship between the observation weight and the second difference is: W=[(δ, Vd)

wherein [(δ, Vd) is an inverse exponential function of the second difference Vd, W is the observation weight, Vd is the second difference, δ is a parameter to be learned, and W takes values in the range [0, 1].

14. The non-transitory computer readable storage medium according to claim 13, wherein in the method, the step of determining pose information of the intelligent vehicle at the current time using the observation weights of the objects in the second point cloud data comprises:

selecting a plurality of feature points in the second point cloud data at the current time;

determining feature points with observation weights less than a preset threshold as static feature points;

matching a plurality of static feature points in the second point cloud data at the current time with a plurality of static feature points in second point cloud data at a previous time to obtain N static feature point matched pairs;

determining a transformation matrix from an intelligent vehicle coordinate system at the previous time to an intelligent vehicle coordinate system at the current time using three-dimensional positions of static feature points of the N static feature point matched pairs in the map coordinate system; and determining a pose of the intelligent vehicle at the current time using a pose of the intelligent vehicle at the previous time and the transformation matrix.

15. The non-transitory computer readable storage medium according to claim 14, wherein in the method, the plurality of feature points comprise edge feature points and planar feature points.

16. An apparatus for localizing an intelligent vehicle in a dynamic scene, comprising:

an acquisition unit configured to acquire first point cloud data collected by a 4D millimeter wave radar, second point cloud data collected by a lidar, and an RGB image collected by an RGB camera, for a target area at a current time;

a detection unit configured to process the RGB image using a target detection model to determine a rectangular box of a movable object;

a division unit configured to convert the first point cloud data and the second point cloud data to a pixel coordinate system, and divide the movable object into a static object and a dynamic object based on a velocity of the first point cloud data in the rectangular box of the movable object;

a first processing unit configured to convert the second point cloud data of the movable object in the pixel coordinate system to a map coordinate system to obtain a semantic point cloud map;

a second processing unit configured to convert the second point cloud data of a communication area outside the rectangular box of the movable object, and of a rectangular box of the static object, in the pixel coordinate system to the map coordinate system to obtain a static point cloud map;

a determination unit configured to determine observation weights for objects in the second point cloud data based on the static point cloud map and the semantic point cloud map; and a localization unit configured to determine pose information of the intelligent vehicle at the current time using the observation weights of the objects in the second point cloud data;

wherein the apparatus further comprises a training unit, and the training unit is configured to:

acquire a training sample set comprising consecutive intelligent vehicle sequence frame data, wherein each of the consecutive intelligent vehicle sequence frame data comprises a first point cloud data sample, a second point cloud data sample, an RGB image sample, and an actual pose of the intelligent vehicle;

process the RGB image sample using the target detection model to determine the rectangular box of the movable object;

convert the first point cloud data sample and the second point cloud data sample to the pixel coordinate system, and divide the movable object into the static object and the dynamic object based on a velocity of the first point cloud data sample in the rectangular box of the movable object;

convert the second point cloud data sample of the movable object in the pixel coordinate system to the map coordinate system to obtain a semantic point cloud map sample;

convert the second point cloud data sample of the communication area outside the rectangular box of the movable object, and of the rectangular box of the static object, in the pixel coordinate system to the map coordinate system to obtain a static point cloud map sample;

determine the observation weights for the objects in the second point cloud data sample based on the static point cloud map sample and the semantic point cloud map sample;

acquire a distance value from the lidar for each point in the second point cloud data sample;

calculate a third distance value in the static point cloud map sample for the distance value from the lidar for each point, and a fourth distance value in the semantic point cloud map sample for the distance value from the lidar for each point, and determine a difference between the third distance value and the fourth distance value;

determine an observation weight corresponding to the difference between the third distance value and the fourth distance value according to an equation for a relation between the observation weight and the difference: W=f(δ, ∇d); wherein f(δ, ∇d) is an inverse exponential function, W is the observation weight, ∇d is the difference, δ is a parameter to be learned, and W takes values in a range [0, 1];

determine predicted pose information of the intelligent vehicle at a current frame using the observation weights of the objects in the second point cloud data sample;

calculate a position error using predicted position information and actual position information of the intelligent vehicle at the current frame; and
update the parameter $\delta$ using the position error.

* * * * *